United States Patent [19]
Tanaka et al.

[11] Patent Number: 4,607,721

[45] Date of Patent: * Aug. 26, 1986

[54] MUFFLER FOR EXHAUST GAS FROM AN INTERNAL COMBUSTION ENGINE

[75] Inventors: Hideharu Tanaka; Matsuo Sekiya, both of Hyogo; Fusaoki Uchikawa, Kanagawa, all of Japan

[73] Assignee: Mitsubishi Denki Kabushiki Kaisha, Tokyo, Japan

[*] Notice: The portion of the term of this patent subsequent to Jun. 18, 2002 has been disclaimed.

[21] Appl. No.: 720,926

[22] Filed: Apr. 8, 1985

Related U.S. Application Data

[63] Continuation of Ser. No. 531,894, Jul. 5, 1983, Pat. No. 4,523,662.

[30] Foreign Application Priority Data

| | | | |
|---|---|---|---|
| Nov. 5, 1981 | [JP] | Japan | 56-178570 |
| Nov. 5, 1981 | [JP] | Japan | 56-178571 |
| Nov. 5, 1981 | [JP] | Japan | 56-178572 |
| Nov. 5, 1981 | [JP] | Japan | 56-178573 |
| Jan. 29, 1982 | [JP] | Japan | 57-12863[U] |
| May 28, 1982 | [JP] | Japan | 57-91625 |

[51] Int. Cl.$^4$ ............................................. F01N 1/10
[52] U.S. Cl. ................................. 181/249; 181/252; 181/256; 181/272
[58] Field of Search ...................... 181/245, 249–250, 181/255, 228, 227, 256, 252, 291, 251, 258, 265, 266, 272

[56] References Cited

U.S. PATENT DOCUMENTS

| | | | |
|---|---|---|---|
| 2,043,731 | 6/1936 | Bourne | 181/248 |
| 3,613,830 | 10/1971 | Hubbell, III | 181/266 |
| 4,523,662 | 6/1985 | Tanaka et al. | 181/249 |

*Primary Examiner*—Benjamin R. Fuller
*Attorney, Agent, or Firm*—Sughrue, Mion, Zinn, Macpeak, and Seas

[57] ABSTRACT

A muffler of the absorption type for the exhaust gas of an internal combustion engine including a cylindrical porous sound-absorbing body 1, and a film 5 of the metal or other material formed cylindrically on the inner surface of the porous body 1. The film prevents clogging of the pores in the porous body and enables the absorption of the sound in a wide frequency range.

13 Claims, 28 Drawing Figures

FIG. 1 PRIOR ART
(a)
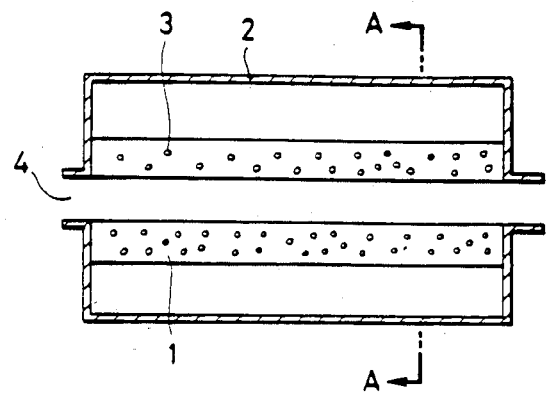
(b)
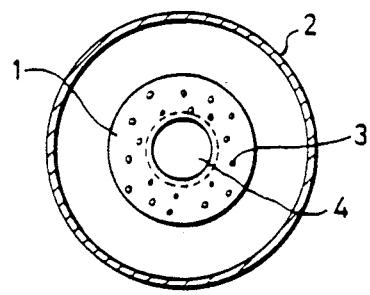

FIG. 2
(a)
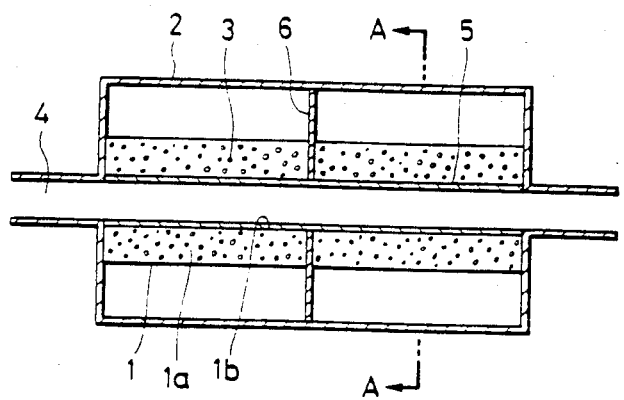
(b)
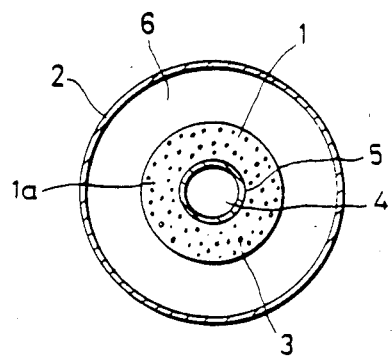

FIG. 3
(a)
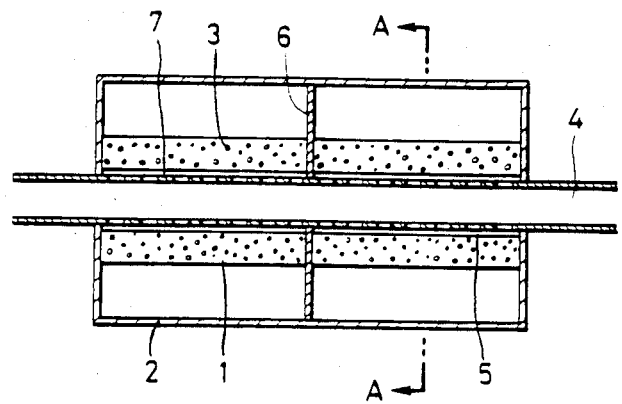
(b)
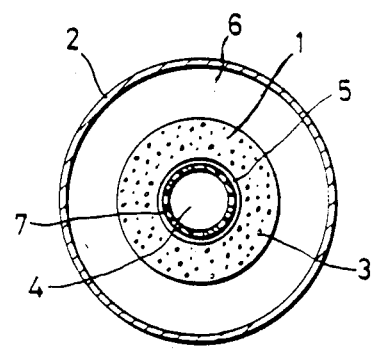

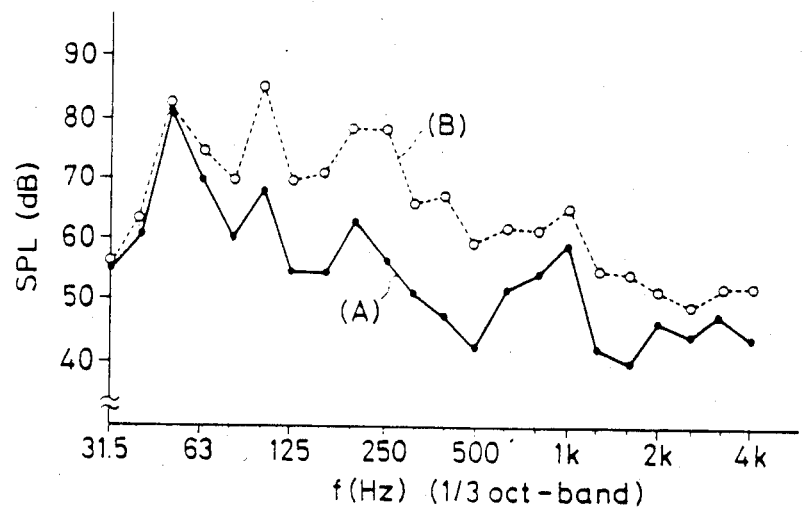
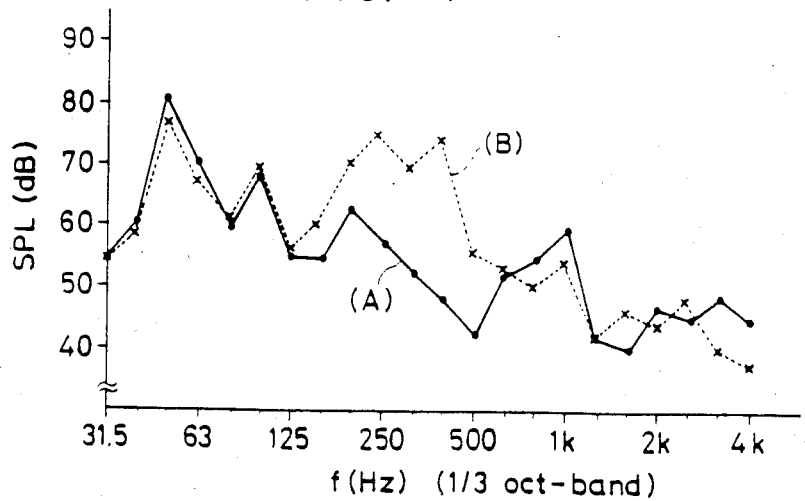

(A)

FIG. 9
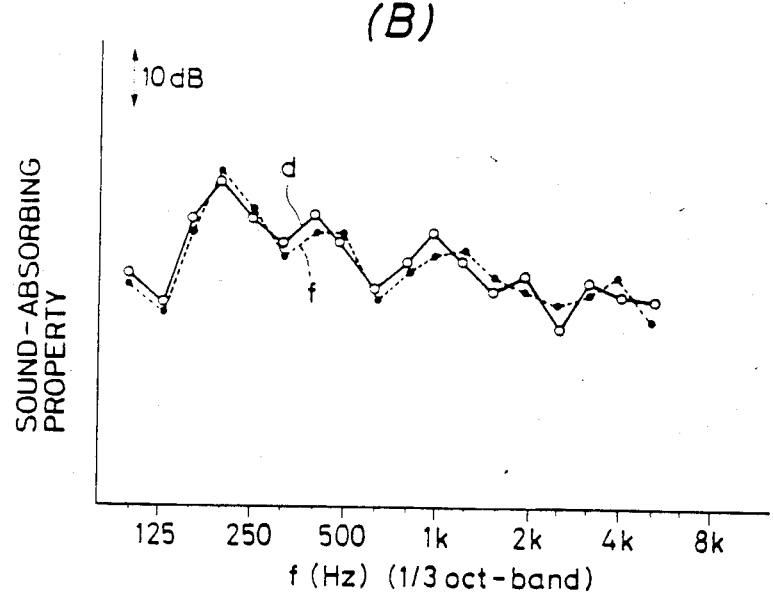
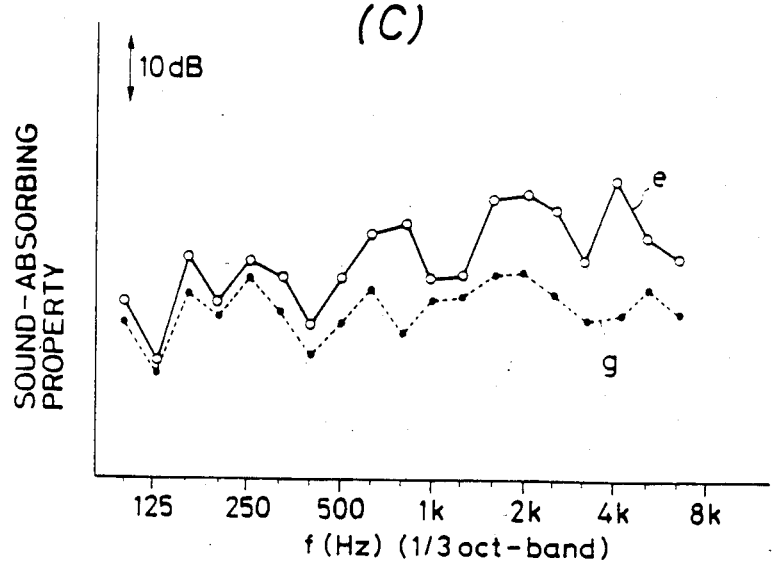

MUFFLER FOR EXHAUST GAS FROM AN INTERNAL COMBUSTION ENGINE

RELATED APPLICATIONS

This is a continuation of U.S. patent application Ser. No. 531,894, filed July 5, 1983 now U.S. Pat. No. 4,523,662.

TECHNICAL FIELD

This invention relates to a muffler of the absorption type for exhaust gas from an internal combustion engine. The muffler is composed of a cylindrical porous sound-absorbing material having a film of, for example, glass, rock or steel wool, or a porous ceramic or metallic material. It utilizes the basic advantages of the absorption type structure which reside in an improvement in fuel consumption and engine output, while overcoming its drawbacks by preventing the clogging of the cylindrical porous sound-absorbing material and imparting a greater scope of sound-absorbing capacity thereto.

BACKGROUND ART

Glass, rock or steel wool, and a porous ceramic or metallic body are, for example, well known as the sound-absorbing material in a muffler for a machine in general.

FIG. 1(a) shows a conventional muffler for exhaust gas having a cylindrical porous sound-absorbing member 1 composed of, for example, a porous metallic material, a casing 2 which houses the sound-absorbing member 1, and an exhaust gas passage 4 defined within the sound-absorbing member 1. The sound-absorbing member 1 has pores 3.

This muffler, however, has a very short life, since the soot or tarry substance resulting from the combustion of gasoline or other fuel, and adhering to the surface and interior of the sound-absorbing member gives rise to its clogging and lowers its sound-absorbing capacity drastically within a relatively short time.

Therefore, the inventor of this invention has made an extensive study of the mechanism which may cause the soot in exhaust gas to adhere to the sound-absorbing member, and found various things as will hereinafter be set forth. As the sound-absorbing member is porous, exhaust gas flows into its interior. The soot in the exhaust gas is composed of fine particles having a diameter of, say, 100 to 1,000 Å which is very small as compared with the diameter of the pores in the porous sound-absorbing member. As the exhaust gas flows into the sound-absorbing member, the soot enters it and adheres to its aggregate. The soot particles become larger by mutual adsorption, and clog the pores in the sound-absorbing material. The adherence of soot is promoted by the presence of, for example, water such as condensed water, or a tarry substance.

DISCLOSURE OF THE INVENTION

This invention provides a muffler for exhaust gas comprising a casing, and a cylindrical porous sound-absorbing member extending through the casing, characterized in that a cylinder formed from a film having a prescribed thickness is provided on the inner surface of the sound-absorbing member. The soot and tar which the exhaust gas passing through the sound-absorbing member contains are prevented by the film from contacting the inner surface of the sound-absorbing member and entering its interior.

BRIEF DESCRIPTION OF THE DRAWINGS

FIG. 1(a) is a longitudinal sectional view of a conventional muffler for exhaust gas from an internal combustion engine;

FIG. 1(b) is a sectional view taken along the line A—A of FIG. 1(a);

FIG. 2(a) is a longitudinal sectional view of a muffler embodying this invention;

FIG. 2(b) is a sectional view taken along the line A—A of FIG. 2(a);

FIGS. 3(a), 3(b), 4 and 5 are views showing other embodiments of this invention;

FIGS. 6 and 7 are graphs showing the sound-absorbing capacity of the muffler according to this invention;

BEST MODE OF CARRYING OUT THE INVENTION

Figure 4:
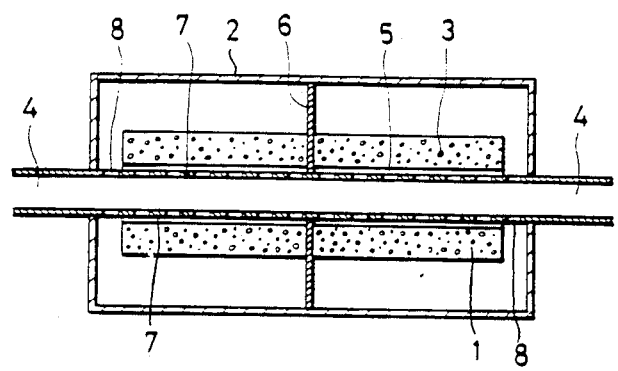

In order to solve the aforesaid problems, the inventor has made an extensive study of a sound-absorbing structure in which no exhaust gas flows into the sound-absorbing material; and in which the sound-absorbing material has only a low degree of roughness in its wall surface contacting the exhaust gas. The inventor has thought of providing a gas-impermeable film in cylindrical form on the surface of the sound-absorbing material which would otherwise be exposed to the exhaust gas, so that no exhaust gas may flow into the interior of the sound-absorbing material.

The gas-impermeable film, however, prevents the propagation of sound waves into the sound-absorbing material, and thereby lowers its sound-absorbing efficiency. A detailed experimental study has, therefore, been made on the material and thickness of the film, etc., and indicated that an improved sound-absorbing property which is better than that of the sound-absorbing material can be obtained if the proper value of the mechano-acoustical impedance system which depends on such factors as the voids in the film and the sound-absorbing material is selected in a low-frequency range which requires a high acoustic absorptivity.

It is necessary that a muffler for exhaust gas be made of a material which can withstand a maximum temperature of, say, 800° C.

The temperature of exhaust gas from an internal combustion engine in normal operatin varies in a range of several hundred degrees C. Therefore, the film is subjected to a large heat strees repeatedly, and also the fluid pressure created by the exhaust gas. A high mechanical strength is, therefore, required of the film.

In view of these requirements for heat resistance and mechanical strength, it is preferable that the film in a muffler for exhaust gas be prepared from a metal. The inventor of this invention has, therefore, studied a number of methods, including the bonding or welding of the film directly or indirectly to the surface of the sound-absorbing member 1 which comprises a porous metallic body, and the formation of the film on the surface of the porous metallic body itself by appropriate treatment.

All of these methods are, however, low in productivity, since if the problem of the heat stress as hereinabove discussed is taken into consideration, it is necessary to join directly the film and the porous metallic body having an equal coefficient of thermal expansion without the aid of any adhesive having a different coefficient of thermal expansion.

This invention, therefore, provides a muffler for exhaust gas which is excellent in productivity, heat resistance and strength, and free from any clogging of the sound-absorbing material by soot adhering thereto, and has an improved capacity of deadening any sound in a low-frequency range.

The invention will now be described in detail by way of example with reference to the drawings.

FIG. 2 schematically shows an exhaust system including a sound-absorbing member provided with a film. It is shown in longitudinal section in FIG. 2(a), and its cross section taken along the line A—A of FIG. 2(a) is shown in FIG. 2(b).

The sound-absorbing member 1 is provided with the film 5. It is in the form of a cylindrical pipe prepared from a flat plate of porous Ni-Cr sponge metal 1a manufactured by Sumitomo Electric Industrial Co., Ltd. and known under the tradename "SERUMETTO", and a commercially available Ni-Cr metal film 5 having a thickness of 10 microns by a method which comprises degreasing the plate and the film, placing the film on the plate, applying a uniform load of about 50 g/cm$^2$ thereto, heating them at 1,000° C. for about two hours in hydrogen gas to join them together, and forming them into a cylindrical shape at about 600° C. The cylindrical pipe extends through a casing 2 and defines a passage 4 for exhaust gas therein.

The porous metallic body in cylindrical form is shown at 1, and the metal film in cylindrical form at 5.

This method, however, requires a long period of heating at a very high temperature in an inert gas atmosphere, and the equipment therefor. Therefore, description will be made of another embodiment that provides a higher degree of productivity.

FIG. 3 shows a muffler for exhaust gas embodying this invention. It comprises a porous body 1 and a film 5 which are made of a Ni-Cr metal as those shown in FIG. 2(a). It further includes a perforated stainless steel pipe 7 having a wall thickness of 0.6 mm, a hole diameter of 2 mm and a total hole area which occupies about 40% of the surface area of the wall. The metal film 5, which is commercially available, is sandwiched between the porous body 1 and the perforated pipe 7. The porous body 1, the film 5 and the perforated pipe 7 define a cylindrical pipe together. The porous body 1 is longitudinally split in two halves to facilitate the insertion of the film 5. There is no limitation in particular to the manner in which the porous body 1 is held in position.

The structure shown in FIG. 3 is excellent in productivity, since it does not require any complicated manufacturing process, but is very easy to manufacture. There is no substantial fear of the film 5 being destroyed by thermal expansion, since it is simply held between the porous body 1 and the perforated pipe 7 without being secured or bonded thereto. Accordingly, the porous body 1 and the film 5 of this structure do not necessarily need to be prepared from materials having an equal coefficient of thermal expansion.

The sound-absorbing capacity of the muffler can be controlled as desired to some extent if the material and thickness of the film are appropriately selected.

FIG. 4 shows another muffler for exhaust gas embodying this invention. The casing 2 is divided longitudinally into two compartments. A cylindrical structure formed by the porous body 1 and the metal film 5 in each compartment is smaller in length than the compartment. A portion of the perforated pipe 7 is, therefore, exposed to the interior of each compartment, and provided with holes 8 which connect the exhaust gas passage and the internal space of the compartment.

Figure 5:
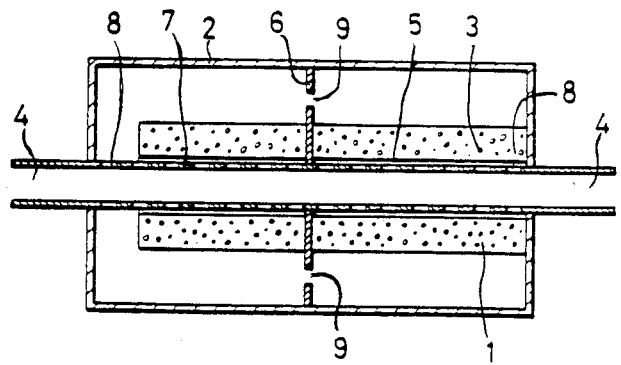

FIG. 5 shows still another embodiment of this invention. The muffler is divided by a partition 6 into a front compartment and a rear compartment. the porous body 1 and the metal film 5 in the front compartment are smaller in length than the co mpartment. A portion of the perforated pipe 7 in the front compartment is, therefore, exposed to the interior of the compartment, and provided with holes 8 which connect the exhaust gas passage and the internal space of the front compartment. The partition 6 is also provided with a number of apertures 9.

The mufflers shown in FIGS. 4 and 5 are equal to that of FIG. 2 in overall dimensions and the materials and thicknesses of the porous body 1 and the metal film 5.

The mufflers shown in FIGS. 2 and 5 were each connected to the exhaust pipe of a four-cylinder gasoline engine having a displacement of 1,600 cc, and the levels of the noise produced by its exhaust gas were measured in accordance with the requirements of JIS D-1616.

The results are shown in FIG. 6. The abscissa indicates the ⅓ oct-band center frequency and the ordinate indicates the sound pressure level of the noise produced by the exhaust gas. Curve A shows the results obtained with the muffler of FIG. 5, while curve B shows the results obtained with the muffler of FIG. 2.

As is obvious from FIG. 6, the holes 8 connecting the exhaust gas passage and the space around the porous body improves the sound-deadening power of the muffler by about 5 to 15 dB over the whole frequency range. If the amplitude of the sound waves entering the sound-absorbing material is very small, the sound-absorbing material provided with the film can effectively deaden the noise. However, in a muffler provided for an internal combustion engine the noise of the exhaust gas has irregular waves of a very high pressure and amplitude which are due to the impact waves produced by the explosion in the engine. The very high pressure causes tension and increased mechanical impedance in the thin film, thereby reducing the flow of the sound waves through the thin film to the sound-absorbing body. In an extreme case the muffler would have no sound-absorbing ability with respect to these waves.

In order to avoid the latter, it is necessary either to provide a baffle in the exhaust gas passage to create an increased resistance to the flow of exhaust gas or to employ a resonator. The baffle, however, creates an increased back pressure on the engine which may result in adverse effects on its output and fuel consumption. According to this invention, the holes 8 connecting the exhaust gas passage and the space around the sound-absorbing material define a sort of resonator which improves the sound-deadening capacity of the muffler.

A commercially available muffler for exhaust gas and the muffler of FIG. 5 were compared under the same conditions for use on a four-cycle, four-cylinder gasoline engine for a small automobile having a displacement of 1,600 cc, and the levels of the noise produced by the exhaust gas were compared. The results are shown in FIG. 7, in which the abscissa and the ordinate indicate what has already been explained in connection with FIG. 6. Curve A shows the results obtained by the muffler of FIG. 5, while curve B shows the results obtained by the commercially available reactive type muffler.

As is obvious from FIG. 7, the muffler of this invention is definitely superior in the sound-deadening property in a frequency range of 125 to 500 Hz.

The metal film 5 surrounding the exhaust gas passage 4 prevents intrusion of tar and soot from the exhaust gas into the porous sound-absorbing material. Even if such tar and soot adhere to the metal film, they can immediately be blown away by the stream of exhaust gas. A muffler of this type embodying this invention will now be described.

Figure 8:
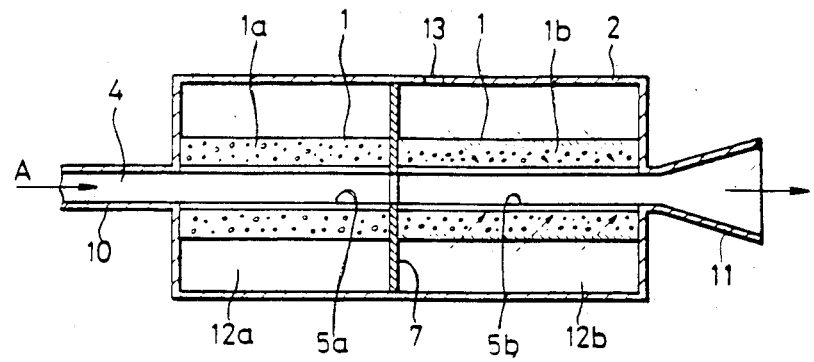
FIG. 8 is a longitudinal sectional view of still another muffler embodying this invention.

Referring to FIG. 8, there are shown a casing 2, an inlet pipe 10 for exhaust gas and an outlet pipe 11 therefor. A cylindrically shaped porous sound-absorbing body 1 defines therein a passage 4 for exhaust gas which connects the inlet and outlet pipes 10 and 11 in a straight line. Metal films 5a and 5b are, for example, provided on the wall of the passage 4. As is obvious from FIG. 8, the sound-absorbing body 1 is divided into two halves 1a and 1b in its longitudinal center in the direction of flow of exhaust gas. The film 5a provided on the first or upstream half 1a is smaller in thickness than the film 5b on the second or downstream half 1b. More specifically, the film 5a has a thickness of 10 microns, and the film 5b has a thickness of 30 microns. A partition 6 is disposed between the two halves 1a and 1b, and divides the interior of the casing 2 into a front compartment 12a and a rear compartment 12b. The casing 2 has a hole 13.

Exhaust gas A is introduced into the exhaust gas passage 4 through the inlet pipe 10, and discharged therefrom through the outlet pipe 11. Even if the tar and soot in the exhaust gas adhere to the films 5a and 5b, they are immediately blown away from the films 5a and 5b, by the exhaust gas, and discharged with the exhaust gas. The sound is absorbed by the porous sound-absorbing body 1, and deadened.

Figure 9:
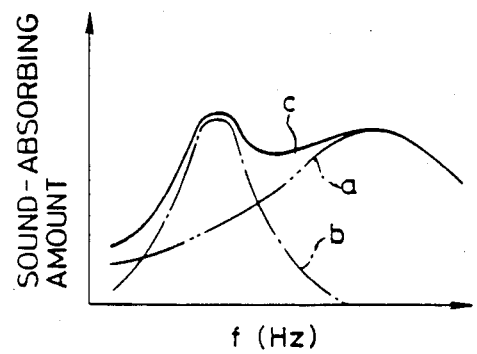
FIGS. 9(A) to 9(C) are graphs showing the characteristics of the muffler shown in FIG. 8.

In FIG. 9(A), curves a and b show the sound-absorbing properties of the front and rear compartments 12a and 12b, respectively, of the muffler shown in FIG. 8, while curve c shows the sound-absorbing property of the muffler as a whole. As is obvious from FIG. 9(a), the front compartment 12a having a relatively thin film 5a is excellent for absorbing the sound in a high frequency range, while the rear compartment 12b having a relatively thick film 5b is more effective for absorbing the sound in a low frequency range, and the muffler as a whole shows the combined characteristics. In other words, the muffler as a whole is excellent in sound absorptivity in a wide frequency range from a low to a high frequency.

The muffler shown in FIG. 8 was compared in sound-deadening capacity with the conventional muffler in which no film was provided on the sound-absorbing material.

Each of the mufflers was connected to an engine having a displacement of 1,800 cc in a Japanese automobile, and after the automobile had been driven for a distance of about 10,000 km, the sound-deadening capacity of the muffler was examined and compared with its initial capacity. FIG. 9(B) shows the results obtained with the muffler of this invention, while FIG. 9(C) shows the results obtained with the conventional muffler shown in FIG. 1.

In FIGS. 9(B) and 9(C), curves d and e represent the initial capacity, and curves f and g show the capacity found after the automobile had been driven. It will be noted that the muffler of this invention hardly showed any reduction in sound-deadening capacity, while the conventional muffler showed a great reduction in capacity, particularly in a high frequency range.

The sound-absorbing material was taken out of each muffler, and inspected visually. No soot was found in the interstices in the aggregate of the sound-absorbing material in the muffler of this invention, though some soot was found on its surface. Lots of tar and soot were, however, found on the surface of the sound-absorbing material in the conventional muffler, and even in its interior, clogging its pores almost completely.

These results teach that the film provided in the muffler of this invention prevents completely the penetration of tar or soot into the sound-absorbing material. The surface of the thin metal film which is exposed to exhaust gas is so smooth that substantially no soot adheres thereto. Even if some soot adheres thereto, almost all of such soot is blown away by the exhaust gas, and no soot in the quantity which may affect the sound-absorbing capacity is left on the surface of the sound-absorbing material.

Discussion will now be made of the requirements to be met for the formation of the film. The film, which is used with the sound-absorbing material in a muffler for exhaust as, is required to withstand a maximum temperature of, say, 800° C., as hereinbefore pointed out. Moreover, the temperature of exhaust gas from an internal combustion engine varies in a range of several hundred degrees C., and therefore, the film is subjected to a large heat stress repeatedly. The film is, therefore, required to be high in mechanical strength, also because the fluid pressure created by the exhaust gas acts thereon. These requirements for heat resistance and mechanical strength render it preferable for the film to be prepared from a metal, and the problem of the heat stress makes it desirable for the film and the porous sound-absorbing material to have an equal coefficient of thermal expansion. It is, therefore, necessary for the film and the sound-absorbing body to be prepared from the same metal, and joined directly to each other without the aid of any adhesive having a different coefficient of thermal expansion.

According to another aspect of this invention, there is provided a sound-absorbing material which comprises a porous metallic body, and a film of the same metal welded or fused to the surface of the porous body, and which is, therefore, not clogged by tar or soot, but shows an improved sound-absorbing property in a low frequency range, while it is also satisfactory in heat resistance and strength.

This embodiment will hereinafter be described.

Figure 10:
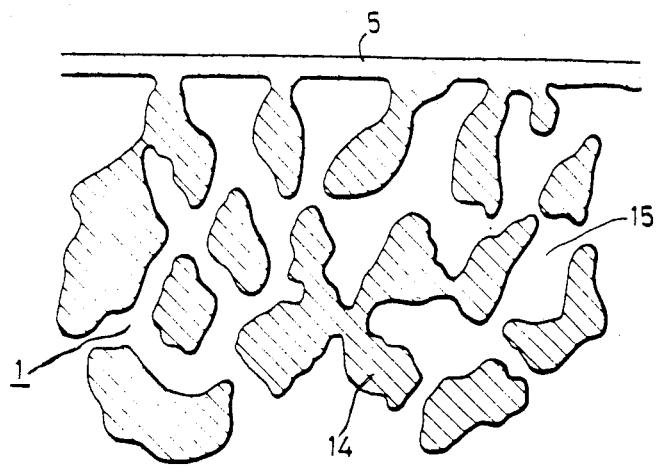
FIG. 10 is a fragmentary enlarged longitudinal sectional view of another embodiment of this invention.

The porous metallic body was prepared from a foamed Ni-Cr metal plate having a thickness of 5 mm and known under the tradename "SERUMETTO", and the film was a Ni-Cr film having a thickness of 5 microns. The film was placed on one surface of the porous body, and they were welded together at about 1,300° C. in an electric furnace filled with an argon gas atmosphere. FIG. 10 is an enlarged sectional view obtained through an optical microscope. The porous body 1 has an aggregate 14 formed with pores 15. The metal film is shown at 5.

Figure 11:
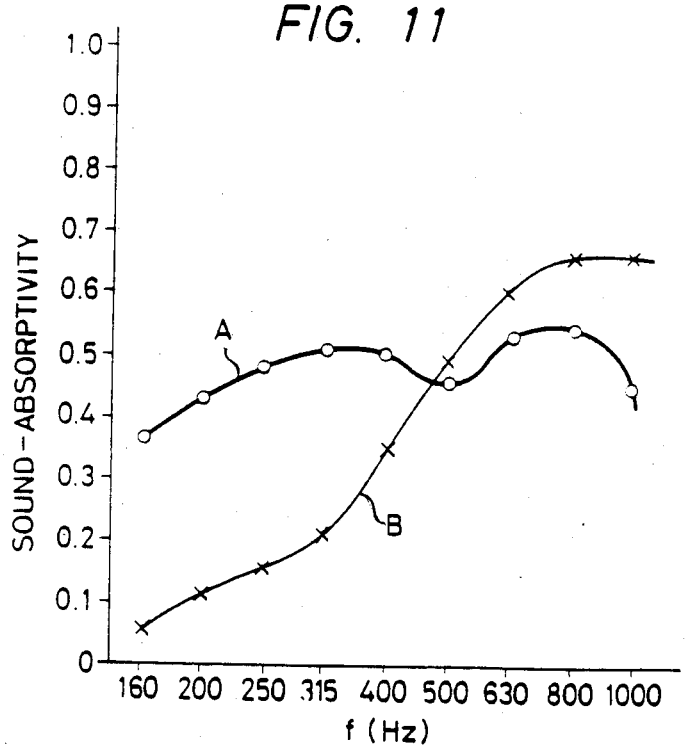
FIGS. 11 and 13 are graph is showing the characteristics of the muffler shown in FIG. 10.
Figure 12:
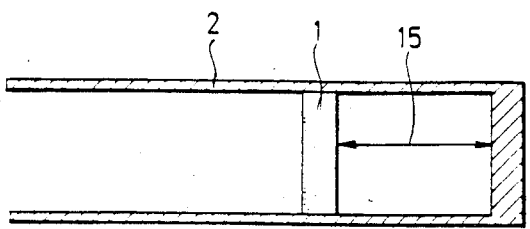
FIG. 12 is a view illustrating the construction from which the characteristics shown in FIG. 11 have been obtained.

The absorption of a perpendicularly incident sound by each of an untreated porous metallic body and the porous metallic body to which the metal film had been welded in accordance with this invention was examined by the pipe method (JIS A1405). The results are shown in FIG. 11. Curve A shows the results obtained with the sound-absorbing material embodying this invention, while curve B shows the results obtained on the sound-absorbing material composed solely of the porous metallic body. Both of the samples includes a 50 mm long air piece 15 provided behind the sound-absorbing material 1 in the casing 2, as shown in FIG. 12. As is obvious from FIG. 11, the sound-absorbing material embodying this invention is considerably higher in the absorptivity for a sound in a low frequency range than the material composed solely of the porous metallic body.

Figure 13:
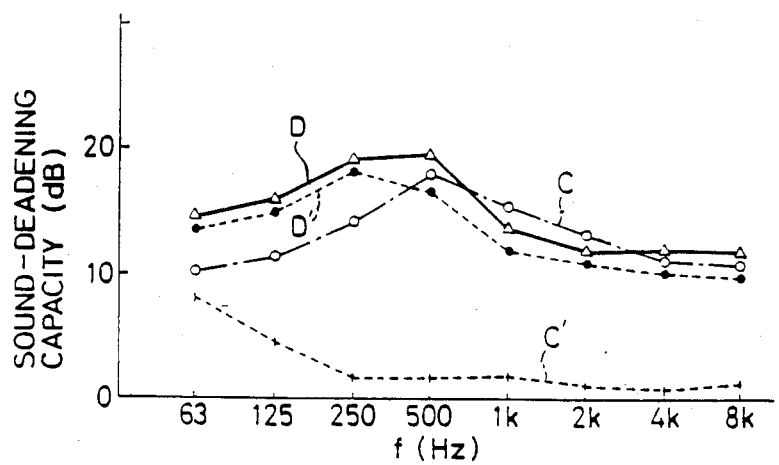

These two kinds of sound-absorbing material were cylindrically formed, and incorporated into a muffler for exhaust gas in a Japanese automobile having an engine displacement of 1,800 cc. After the automobile had been driven for a distance of about 10,000 km, the sound-deadening capacity of each muffler was measured in accordance with JIS D1616, and compared with the initial capacity. The results are shown in FIG. 13. Curves C and C' show the initial capacity of the muffler in which the sound-absorbing material composed solely of the porous metallic body was used, and the capacity which it showed after the automobile had been driven. Curves D and D' show the initial capacity of the muffler in which the sound-absorbing material embodying this invention was used, and the capacity which it showed after the automobile had been driven. As is obvious from FIG. 13, the muffler in which the sound-absorbing material composed solely of the porous metallic body was used showed a serious reduction in sound-deadening capacity in almost the entire frequency range after the automobile had been driven for a distance of 10,000 km, but the muffler including the material embodying this invention almost completely maintained its initial capacity. Both of the sound-absorbing materials were then inspected visually. Only a slight amount of soot and tar was found on the film on the sound-absorbing material of this invention, but lots of soot and tar were found even in the interior of the material composed solely of the porous metallic body, clogging its pores seriously.

The film had a thickness of 5 microns in the embodiments as hereinabove described. It has been found experimentally that a larger film thickness would be better for achieving an improved acoustic absorptivity in a low frequency range, and a smaller film thickness for achieving an improved acoustic absorptivity in a high frequency range. Accordingly, the thickness of the film may be adjusted to suit the desired sound-absorbing property. It has, however, been found experimentally, too, that a film having a thickness exceeding 50 microns shields the sound waves completely, and deprives the sound-absorbing material of its function. It is, therefore, necessary for the film to have a thickness which is not greater than, say, 50 microns.

Although the porous metallic body and the film have been welded together in some of the embodiments described above, fusing them together under pressure and heat are equally effective, if a smaller initial film thickness is employed. This is because as the projections on the surface of the porous body are deformed due to fusing, they will result in a substantial increase in film thickness.

Although the film is provided only on one surface of the porous body in the embodiments as hereinabove described, it is effective to provide films on both surfaces to prevent clogging if both surfaces are exposed to exhaust gas. The film thickness may be reduced to about a half in order to achieve the sound-absorbing property which is obtained when the film is provided only on one surface.

The porous metallic body may also be prepared from a sintered metal, instead of the foamed metal as hereinabove set forth. It may be prepared from not only Ni, but also an alloy such as bronze, Fe-Cr, Fe-Ni-Cr, or Fe-Cr-Al. The exhaust gas of an internal combustion engine contains corrosive sulfur and nitrogen oxides. The corrosion of the porous metallic body may be prevented by the coating of the sound-absorbing material with a heat-resistant paint, for example, a paint composed of aluminum phosphate, alumina, bentonite and water.

The metal film may be formed by another method as will hereinafter be set forth.

Figure 14:
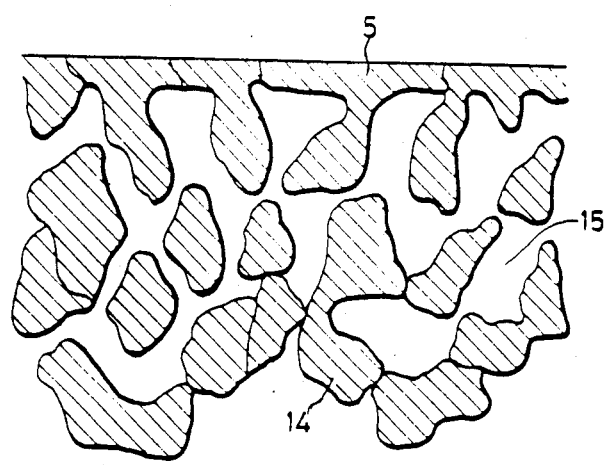
FIG. 14 is a fragmentary enlarged longitudinal sectional view of another embodiment of this invention.

The porous metallic body was prepared from a foamed Ni-Cr plate having a thickness of 5 mm and known under the tradename "SERUMETTO", and one surface thereof was polished by a grinder. Visual inspection confirmed the formation of a complete film on the surface. The cross section of the porous body as inspected by an optical microscope to determine the thickness of the film. The film thickness can be varied if the pressure applied by the grinder and the grinding time are adjusted. FIG. 14 shows an enlarged cross section, in which the aggregate of the porous body 1 is shown at 14, its pores at 15, and the metal film at 5.

The absorptivity for a perpendicularly incident sound by an untreated porous metallic body and the material having one surface on which a film having a thickness of 5 microns had been formed by grinding was measured by the pipe method (JIS A1405). The characteristics in this case show the characteristics of FIG. 11 in the same manner as in the fusing coupling (FIG. 10).

Still another form of the film 5 will now be set forth. The inventor of this invention has studied the formation of a film on the surface of a porous sound-absorbing material in fibrous form by applying a heat-resistant paint thereto and curing it, and found that a film thickness exceeding 250 microns brings about a serious reduction in the sound-absorbing capacity of the material in the entire frequency range and renders it totally unusable. A film having a thickness not exceeding 250 microns, however, provides a higher sound-absorbing capacity in the vicinity of the resonant frequency of the film than the sound-absorbing material known in the art. Accordingly, it is possible to achieve a better sound-absorbing performance than what is obtained by a conventional muffler, if the heat-resistant paint and its coating thickness are so selected that the resonant frequency of the film may exist in a low frequency range below 500 Hz, i.e., a frequency range which is in question with a muffler for exhaust gas.

This embodiment will now be described in detail.

A porous sound-absorbing material was prepared from stainless steel wool (felt), and a paint was uniformly sprayed onto one surface of the material to form a layer having a thickness of 150 microns. The paint was a mixture obtained by mixing the materials in recipe 1 in a ball mill for about 30 minutes. The paint film was dried at 80° C. for 80 minutes, and then, fired at about 550° C. for 30 minutes, whereby the paint was cured. Care should be taken not to apply too much of the paint, since too thick a film is likely to result in a lower sound-absorbing capacity.

RECIPE 1

Binder: 40 parts by weight of aluminum phosphate;
Additives: 60 parts by weight of silica, bentonite and water.

The additives improve the coatability and film-forming property of the paint, the strength of the film, and its adhesion to the porous material.

The sound-absorbing material prepared as hereinabove set forth is shown in enlarged cross section in FIG. 15. The sound-absorbing material, which is composed of a porous material in fibrous form, is shown at 1, and its aggregate at 18. The heat-resistant binder 19 fills the voids in the aggregate 18. The heat-resistant binder 19 applied to the surface of the sound-absorbing material and cured forms a film 20 thereon.

Figure 15:
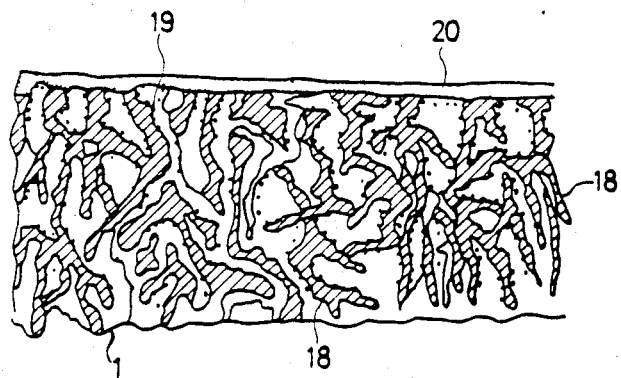
FIG. 15 is a fragmentary enlarged longitudinal sectional view of still another embodiment of this invention.

The sound-absorbing material shown in FIG. 15 was compared in a number of respects with a fibrous sound-absorbing material to which no composition of recipe 1 had been applied.

Figure 16:
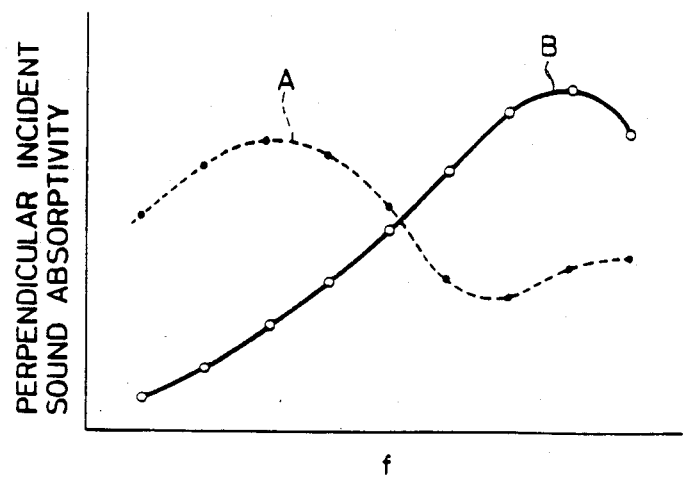
FIG. 16 is a graph showing the relation between the capacity of the muffler shown in FIG. 17 to absorb a perpendicularly incident sound and its frequency.

FIG. 16 compares their absorptivity for a perpendicularly incident sound which was measured by the pipe method (JIS A1405). Curve A shows the results obtained on the material according to this invention, while curve B shows the results obtained on the conventional fibrous sound-absorbing material. As is obvious from FIG. 16, the material of this invention shows a drastically improved absorptivity for a sound in a low frequency range in question with a muffler for exhaust gas, as compared with the conventional material.

Figure 17:
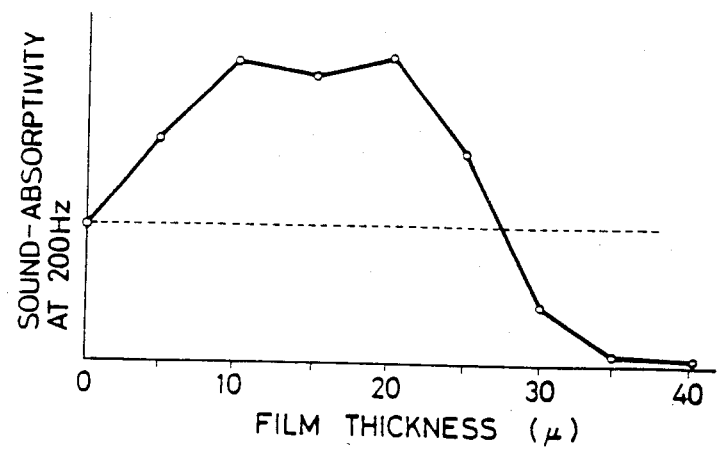
FIG. 17 is a graph showing the sound-absorbing capacity at 200 Hz of the muffler shown in FIG. 17.

This is due to the resonance of the heat-resistant paint film applied and cured on the sound-absorbing material, and an improved absorptivity for the sound in the vicinity of the resonant frequency of the film. FIG. 17 shows the changes in the absorptivity for the sound at 200 Hz in relation to the thickness of the film. As is obvious from FIG. 19, the film thickness exceeding 250 microns brings about a serious reduction in sound absorptivity, and a sound absorptivity which is lower than that of the porous material itself. Accordingly, a film thickness not exceeding 250 microns is necessary to achieve an improved sound absorptivity in a low frequency range.

Figure 18:
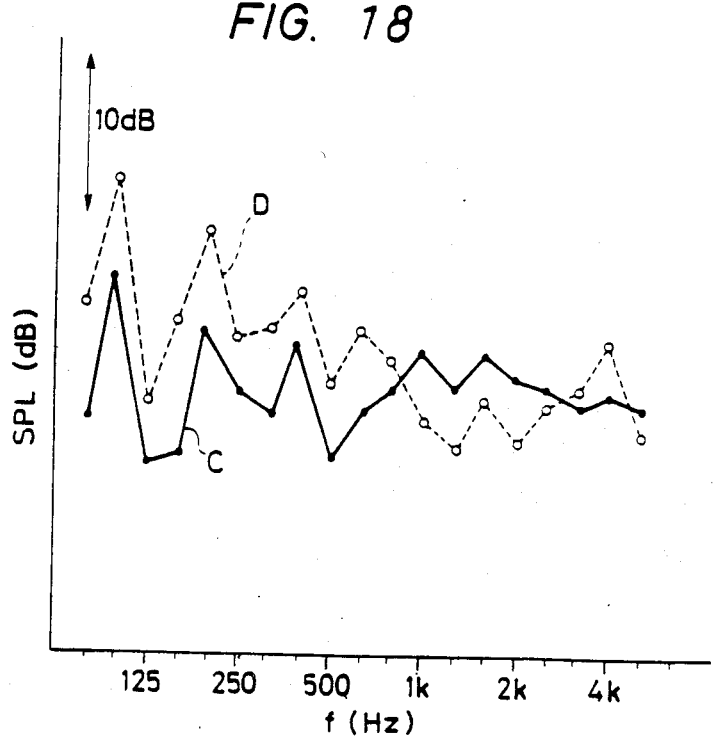
FIG. 18 is a graph showing the sound-pressure level and frequency characteristics of the muffler shown in FIG. 17.

These two kinds of sound-absorbing material were cylindrically formed, and incorporated into a muffler for exhaust gas in a Japanese automobile having an engine displacement of 1,800 cc, and the levels of the noise produced by the exhaust gas were compared. The engine operation and the measurement of the noise level were conducted under exactly the same conditions. FIG. 18 shows the results obtained by ⅓ oct-frequency analysis. Curve C shows the level of the noise produced by the engine equipped with the muffler including the sound-absorbing material of this invention, while curve D shows the results obtained by the muffler including the conventional material. As is obvious from FIG. 20, the material of this invention provides an improvement in the noise level by, say, 5 to 7 dB in a frequency range below 500 Hz, as compared with the conventional material, for the reasons already set forth.

Figure 19:
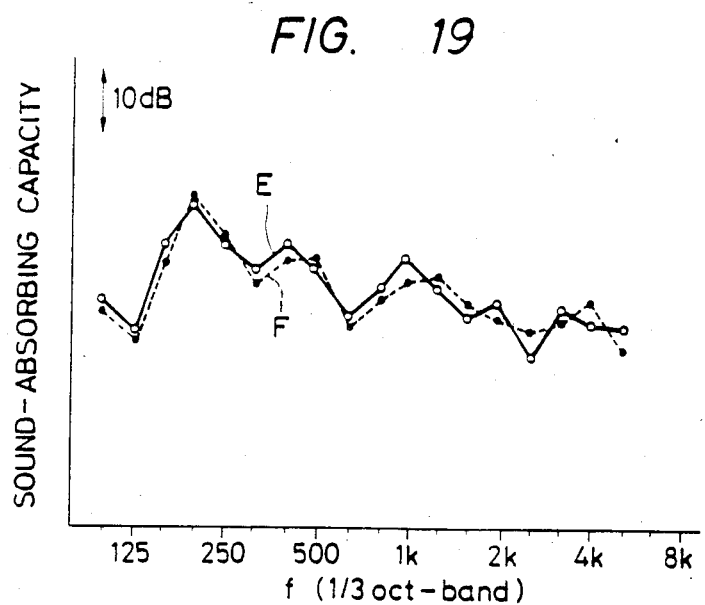
FIGS. 19 and 20 are graphs showing the sound-deadening capacity of the muffler shown in FIG. 17.
Figure 20:
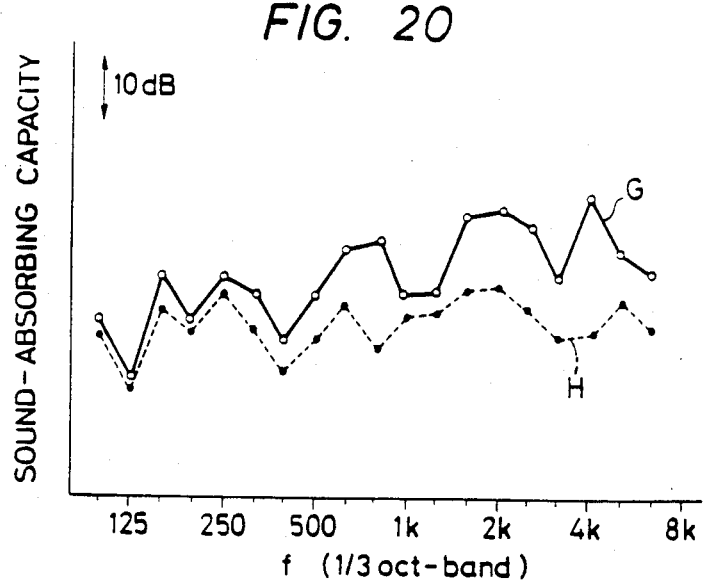

The two kinds of sound-absorbing material were also incorporated into a muffler in a Japanese automobile having an engine displacement of 1,800 cc, and after the automobile had been driven for a distance of about 10,000 km, their sound-deadening capacity was compared with their initial capacity. The results are shown in FIGS. 19 and 20. FIG. 19 shows the results obtained by the material of this invention, while FIG. 20 shows the results obtained by the conventional material.

In FIGS. 19 and 20, curves E and G show the initial capacity, and curves F and H show the capacity found after the automobile had been driven. As is obvious therefrom, the muffler comprising the conventional material shows a serious reduction in sound-deadening capacity especially in a high frequency range, but the muffler comprising the material of this invention does not show any appreciable reduction in sound-deadening capacity.

The sound-absorbing materials were, then, taken out of the mufflers, and visually inspected. Only a slight amount of soot was found on the surface of the material of this invention, and no soot was found in the interstices in the aggregates 18. Lots of tar and soot were, however, found on the surface of the conventional material and even in its interior, clogging its pores almost completely.

As is obvious from these results, the film provided according to this invention prevents the intrusion of any tar or soot into the porous sound-absorbing material. The surface defining the passage for exhaust gas is so smooth that soot does not adhere heavily thereto. The greater part of the soot adhering thereto is blown away by the exhaust gas; therefore, no soot in the quantity affecting the sound-absorbing property of the sound-absorbing material is left on its surface.

Moreover, the heat-resistant paint shown in recipe 1 and adhering to the surface and aggregates 18 of the sound-absorbing material improves its heat resistance, and prevents the decomposition and scattering of the fibers almost completely.

A paint composition prepared according to each of recipes 2 and 3 by the method described with reference to recipe 1 was sprayed onto one surface of a foamed metal plate having a thickness of 5 mm, and cured by firing, whereby two kinds of sound-absorbing materials embodying this invention were prepared.

RECIPE 2

Binder: 30 parts by weight of a silicone resin;

Additives; 60 parts by weight of magnesium oxide and a thinner.

RECIPE 3

Binder: 40 part by weight of sodium silicate;
Additives: 60 parts by weight of alumina, calcium carbonate and water.

Two more kinds of sound-absorbing materials were also prepared, but neither of the compositions according to recipes 2 and 3 was applied thereto. Various properties of these four kinds of sound-absorbing materials were examined. Each of the sound-absorbing materials of this invention carrying a film of the composition according to recipe 2 or 3 having a thickness not exceeding 250 microns was found to have a by far greater sound-absorbing power in a low frequency range than the conventional materials. They did not show any reduction in sound-absorbing power, since only a relatively small quantity of soot or the like adhered thereto. Other advantages included the improved heat resistance and strength of the sound-absorbing material 1 which were due to the heat-resistant paint covering its aggregates.

Examples of the heat-resistant binders which are applicable in accordance with this invention include enamel (vitreous) frits, alkali metal silicates, colloidal silica, colloidal alumina, metal phosphates, cements, and silicone resins (varnish), and the mixtures thereof. Static electricity is generated in the porous sound-absorbing material, and attracts soot and dust. These soot and dust particles combine with other particles to form larger particles which may clog the pores in the porous material.

This problem may be solved by, for example, employing a material in which no static electricity is generated. It would, for example, be effective to apply a heat-resistant binder containing an electrically conductive substance to form a film thereof on the wall surface of the sound-absorbing material exposed to exhaust gas. This aspect of the invention will now be described by way of example.

The porous sound-absorbing material was prepared from stainless steel wool (felt). A paint was prepared by mixing the material according to recipe 4 for about 30 minutes in a ball mill, and sprayed onto one surface of the porous material to form a film having a uniform thickness of 170 microns. The paint was dried at 80° C. for 80 minutes, and fired at about 550° C. for 30 minutes for curing. Care must be taken not to apply too much of the paint, since too thick a film is likely to lower the sound-absorbing power of the porous material.

RECIPE 4

Binder: 40 parts by weight of a aluminum phosphate;
Electrically conductive substance: 30 parts by weight of zinc oxide;
Additives: 60 parts by weight of silica, bentonite and water.

The additives improve the coatability and film-forming property of the paint, the strength of the film and its adhesion to the porous material.

Figure 21:
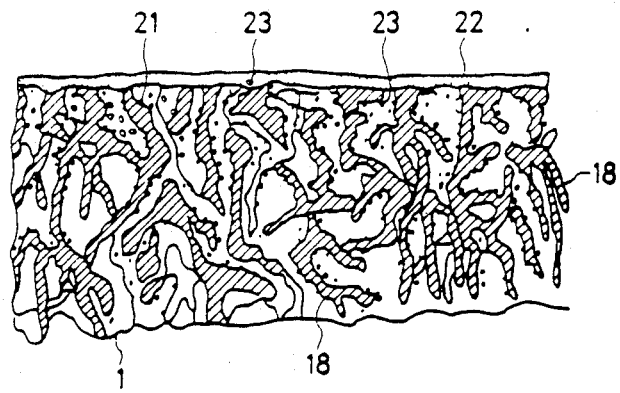
FIG. 21 is a fragmentary enlarged longitudinal sectional view of a further embodiment of this invention.

FIG. 21 shows an enlarged section of the sound-absorbing material prepared as hereinabove described. The porous material in fibrous form is shown at 1, and its aggregates at 18. The heat-resistant binder 21 fills the interstices among the aggregates 18. The film 23 of the heat-resistant binder 21 is formed on the surface of the porous material. The binder 21 and the film 22 contain the electrically conductive substance 23. The sound-absorbing material shown in FIG. 23 was compared in various properties with the fibrous sound-absorbing material to which no composition according to any of recipes 1–4 had been applied.

A tendency similar to that shown in FIG. 18 was found. The sound-absorbing material embodying this invention showed a greatly improved sound absorptivity in the low frequency range which was important to a muffler for exhaust gas, as compared with the conventional material. This is due to the vibration of the film of the heat-resistant paint applied to the sound-absorbing material, and an improved sound absorptivity in the vicinity of the resonant frequency of the film.

FIG. 17 shows the acoustic absorptivity of the sound-absorbing material at 200 Hz in relation to its film thickness. As is obvious therefrom, a film thickness exceeding 250 microns lowers the acoustic absorptivity greater to even a level which is worse than that of the porous base, while a film thickness not exceeding 250 microns enables a greatly improved absorptivity over that of the porous base.

Figure 22:
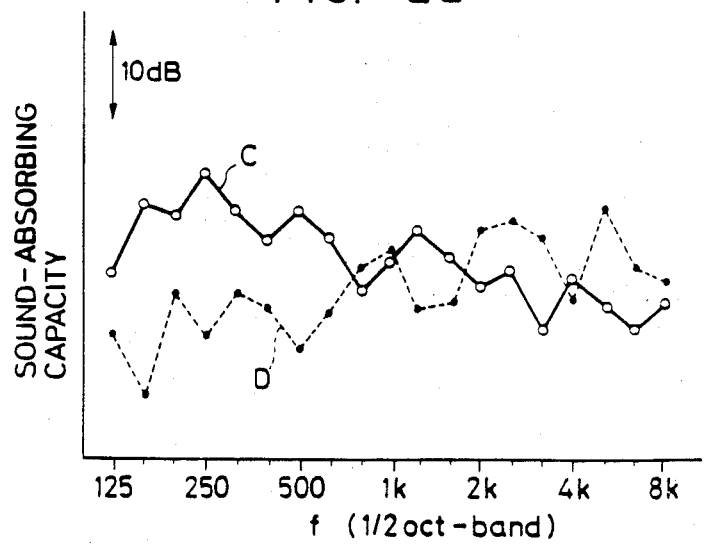
FIGS. 22 and 23 are graphs showing the sound-deadening capacity of the muffler shown in FIG. 23.

The two kinds of sound-absorbing materials were cylindrically formed, and each of them was incorporated into a muffler for exhaust gas in a Japanese automobile having an engine displacement of 1,800 cc. The two mufflers were compared with each other in the power of deadening the noise produced by exhaust gas. The results are shown in FIG. 22. The engines were operated, and the levels of the noise measured under exactly the same conditions. Curve C indicates the level of the noise produced by the exhaust gas flowing out of the muffler comprising the sound-absorbing material embodying this invention, while curve D shows the results obtained on the muffler comprising the conventional material. The noise levels were determined by ⅓ oct-frequency analysis. As is obvious from FIG. 22, the material of this invention improves the sound-deadening power of the muffler by, say, 5 to 7 dB over the conventional material in a low frequency range which is lower than 500 Hz, for the reasons already set forth.

A Japanese automobile having an engine displacement of 1,800 cc and equipped with a muffler comprising each of those two kinds of sound-absorbing materials was driven for a distance of about 10,000 km, and its sound-deadening power was compared with its initial power which had been found before the automobile was driven. The results duplicated those shown in FIGS. 20 and 21.

Figure 23:
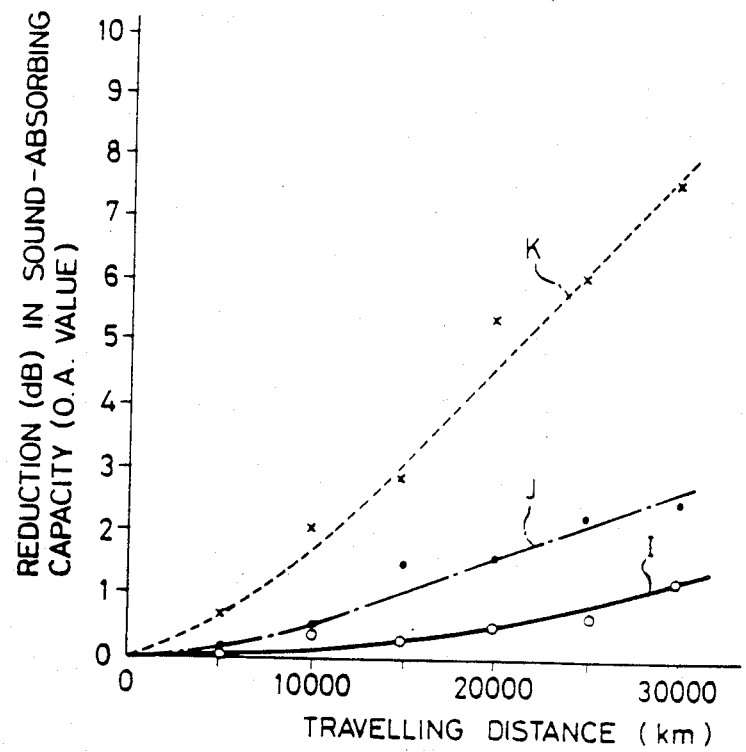

FIG. 23 shows a reduction in the sound-deadening power of the sound-absorbing material clogged with soot or tar in relation to the distance for which the automobile was driven. Curve I shows the results obtained on the muffler comprising the sound-absorbing material with a film formed by spraying a paint according to recipe 4. Curve J shows the results obtained on the muffler comprising the sound-absorbing material on which the film was formed from the heat-resistant binder not containing any electrically conductive substance. Curve K shows the results obtained on the muffler comprising the conventional material. Each of these curves represents an overall quantity of the noise deadened by the muffler during the operation of the engine under the same conditions.

As is obvious from FIG. 23, the muffler comprising the material embodying this invention and containing the electrically conductive substance did not show any appreciable reduction in performance even after the automobile had run a distance of 30,000 km, while the muffler comprising the conventional material showed a reduction of about 8 dB. The muffler comprising the material similar to that of FIG. 23, but not containing any electrically conductive substance was found practically usable, since its reduction in performance was considerably less than that of the muffler comprising the conventional material, though somewhat greater than that of the muffler comprising the material according to FIG. 23.

As is obvious from the foregoing description, hardly any soot or tar remains adherent to the sound-absorbing material embodying this invention. The electrically conductive film provided on the surface surrounding the exhaust gas passage prevents the adherence of soot or tar to the interior of the sound-absorbing material. The surface surrounding the exhaust gas passage is so smooth that no soot or tar adheres thereto strongly, and even if any soot or tar adheres thereto, it is immediately blown away by exhaust gas.

The heat-resistant binder according to recipe 1, and covering the surface and aggregates of the sound-absorbing material embodying this invention improves its heat resistance, and prevents the decomposition and scattering of the fiber almost completely.

Description will now be made of still another embodiment of this invention. A mixture was prepared according to each of recipes 5 and 6 in the manner as hereinbefore described for the preparation of the composition according to recipe 4. It was sprayed onto a porous sound-absorbing material composed of a sintered metal plate having a thickness of 5 mm, and fired for curing.

RECIPE 5

Binder: 30 parts by weight of an alkali metal silicate;
Electrically conductive substance: 20 parts by weight of tin oxide;
Additives: 50 parts by weight of alumina, calcium carbonate and water.

RECIPE 6

Binder: 40 parts by weight of sodium silicate;
Electrically conductive substance: 30 parts by weight of aluminum;
Additives: 60 parts by weight of magnesium oxide and a thinner.

These sound-absorbing materials and another material of the same sintered metal to which neither of the compositions according to recipes 5 and 6 had been applied were examined for various properties exactly as hereinbefore set forth in connection with the sound-absorbing material containing the composition according to recipe 4.

The sound-absorbing materials of this invention each carrying a film of the recipe 5 or 6 composition having a thickness not exceeding 250 microns showed a greatly improved absorptivity for the sound in a low frequency range, as compared with the conventional material. Their sound absorptivity did not show any appreciable reduction, since hardly any soot or tar adhered thereto. Another advantage of the sound-absorbing materials embodying this invention was their improved heat resistance which was due to the heat-resistant binder covering the aggregates 18.

Examples of the heat-resistant binders which can be used for the sound-absorbing materials of this invention include, in addition to the alkali metal silicates, colloidal silica or alumina, enamels (vitreous frits), metal phosphates, cements and silicone resins (varnish), and the mixtures thereof.

The porous material may comprise not only a sintered metal such as sintered iron or aluminum, but also a fibrous material such as glass, rock, stainless steel or slag wool, a foamed metal such as foamed nickel or Ni-Cr, or an alloy such as Fe-Cr, Fe-Ni-Cr or Fe-Cr-Al.

As is obvious from the foregoing description, the sound-absorbing materials embodying this invention, which comprises a porous body and a heat-resistant binder applied and cured on the surface thereof, and containing an electrically conductive substance, have an excellent sound-absorbing power. If they are incorporated into a muffler for the exhaust gas of an internal combustion engine, their excellent initial sound-deadening power can be maintained for a long time without any appreciable reduction, since they are not clogged by soot or tar. Moreover, they are most suitable for use in an atmosphere having a considerably high temperature, since they carry a film formed from a heat-resistant binder.

We claim:

1. A muffler for the exhaust gas of an internal combustion engine, comprising:
a casing,
a perforated sleeve disposed in said casing, said perforated sleeve having an interior through which the exhaust gas flows and a wall having a plurality of openings,
a cylindircal porous sound absorbing body arranged coaxially with said perforated sleeve on an outer periphery of said perforated sleeve,
a cylindrical thin film made of metal, said cylindrical thin film being intimately interposed between said perforated sleeve and said cylindrical porous sound-absorbing body,
a space defined between an inner periphery of said casing and an outer periphery of said cylindrical porous sound-absorbing body, and
at least one communication passage means for providing a pressure balancing communication between the interior of said perforated sleeve and said space.

2. A muffler as set forth in claim 1, wherein said sound-absorbing body and said thin metal film are smaller in length than said casing.

3. A muffler as set forth in claim 1, wherein said thin metal film, which surrounds a passage for the exhaust gas, has a smaller thickness in the upstream portion of said passage than in its downstream portion.

4. A muffler as set forth in claim 1, wherein said thin metal film is welded or fused to the surface of said porous metal.

5. A muffler as set forth in claim 1, wherein said porous metal has a surface ground to form said thin metal film.

6. A muffler as claimed in claim 1, wherein said sound-absorbing body is a porous metal.

7. A muffler as claimed in claim 1, wherein said thin metal film has a thickness of less than 50 micrometers.

8. A muffler as claimed in claim 1, wherein said sound-absorbing body is a porous nickel-chromium alloy.

9. A muffler as claimed in claim 1, wherein said thin metal film is a nickel-chromium alloy film.

10. A muffler as claimed in claim 1, wherein said sound-absorbing body is divided into sections longitudinally of said muffler and said sections are separated by partitions.

11. A muffler as claimed in claim 1, wherein said sound-absorbing body and said thin metal film are smaller lengthwise than the length of said casing so that said sound-absorbing body and thin metal film do not reach either end of said casing, said sound absorbing body being positioned inside said casing so as to leave an air space between the wall of said casing and said body, and partition means extending from said casing wall to said thin metal film for separating said body and said air space into segments longitudinally of said muffler, said partition means having openings therein to permit communication betwen said segmented air spaces.

12. A muffler as claimed in claim 11, wherein said sound-absorbing body is a porous nickel-chromium alloy.

13. A muffler as claimed in claim 12, wherein said thin metal film is a nickel-chromium alloy film.

* * * * *